United States Patent [19]

Warren et al.

[11] Patent Number: 5,051,474

[45] Date of Patent: Sep. 24, 1991

[54] THERMOPLASTIC ELASTOMER ADHESIVE

[75] Inventors: Patrick A. Warren, Erie; Marvin C. Hill, Fairview; Nicholas J. Gervase, Erie; Helmut W. Kucera, West Springfield, all of Pa.; Ernest B. Troughton, Jr., Cary, N.C.

[73] Assignee: Lord Corporation, Erie, Pa.

[21] Appl. No.: 508,387

[22] Filed: Apr. 11, 1990

[51] Int. Cl.$^5$ .............................................. C08L 75/06
[52] U.S. Cl. ................................... 525/131; 525/455; 525/456; 525/457
[58] Field of Search ................. 525/131, 456, 457, 455

[56] References Cited

U.S. PATENT DOCUMENTS

| | | | |
|---|---|---|---|
| 3,284,392 | 11/1966 | Steinfink | 260/29.3 |
| 3,354,237 | 11/1967 | Shaw | 260/329 |
| 3,959,562 | 5/1976 | Hackhel | 428/423 |
| 4,167,500 | 9/1979 | Jazenski et al. | 260/29.3 |
| 4,197,219 | 4/1980 | Damico | 260/7 |
| 4,652,475 | 3/1987 | Haney et al. | 428/36 |
| 4,720,398 | 1/1988 | van Aalten et al. | 427/208.2 |
| 4,769,413 | 9/1988 | Fleming et al. | 524/507 |
| 4,898,919 | 2/1990 | Ueda et al. | 525/440 |
| 4,914,149 | 4/1990 | Fleming et al. | 524/507 |

Primary Examiner—Melvyn I. Marquis
Assistant Examiner—Thomas Hamilton, III
Attorney, Agent, or Firm—W. Graham Buie

[57] ABSTRACT

A chemical formulation useful as a coating, primer or adhesive including a linear polyester polyurethane, a halogenated polyolefin, a phenolic resin, and a crosslinker. The formulation is preferably utilized as a two-component adhesive for bonding polymer blend-based thermoplastic elastomers to various substrates such as metal.

14 Claims, No Drawings

2

THERMOPLASTIC ELASTOMER ADHESIVE

FIELD OF THE INVENTION

This invention relates to the bonding of elastomeric materials to various substrates. More specifically, the present invention is an improved adhesive composition which is capable of providing high strength and environmentally resistant bonds between certain thermoplastic elastomers and various substrates such as metal.

BACKGROUND OF THE INVENTION

The bonding of natural or synthetic rubber to various substrates is well known and is utilized in many industries involving devices which require the interface of rubber and structural parts or components. In order to bond a natural or synthetic rubber to a substrate, an appropriate adhesive is typically applied between the rubber and the substrate under heat and pressure such that the curing of the rubber and the cross-linking or curing of the adhesive can occur simultaneously. Once the rubber has fully cured, any excess rubber must be discarded since fully cured rubber cannot be remelted and used in another application. Therefore, substantial waste is involved in preparing many rubber-bonded parts and components for use in industry.

Thermoplastic elastomers have been developed in order to alleviate this waste problem associated with natural and synthetic rubbers. Thermoplastic elastomers, unlike natural or synthetic rubbers, can be remelted and recycled so as to avoid substantial waste. Although thermoplastic elastomers do not have the strength or other mechanical characteristics required in highly demanding applications, thermoplastic elastomers are a viable alternative for numerous less demanding applications previously utilizing natural or synthetic rubber. One type of thermoplastic elastomer is comprised of cured rubber (EPDM) particles dispersed within a polymer matrix such as a polypropylene matrix and an example of such a commercially available thermoplastic elastomer is the elastomer sold under the trade name SANTOPRENE by Monsanto.

As in the case of natural or synthetic rubbers, thermoplastic elastomers require appropriate adhesives for bonding to various substrates in order to create a bonded part useful in a typical application. Various adhesives and methods have been previously developed for bonding thermoplastic elastomers. For example, U.S. Pat. No. 4,720,398 discloses a process for improving the adhesion of synthetic yarns, cords or fabrics to thermoplastic elastomers by applying a certain adhesive composition to the yarns, cords or fabrics followed by drying of the treated article. The adhesive composition consists of an aqueous solution or dispersion of a polyurethane containing ionic groups, capped isocyanate groups, and groups with a Zerewitinoff-active H-atom.

U.S. Pat. No. 4,652,475 discloses an adhesive formulation for bonding a thermoplastic material to an elastomeric material under heat and pressure. The adhesive formulation contains a blend of thermoplastic and elastomeric materials which incorporates a formaldehyde donor/acceptor system such as resorcinol and hexamethoxymethylmelamine. The blend of thermoplastic and elastomeric materials are selected depending on the type of materials to be bonded.

A new class of melt processible thermoplastic elastomers based on compatible blends of an ethylene copolymer and vinyl or vinylidene halide polymer have been recently developed which are reported to have excellent ozone, weathering, oil and heat resistance. These new types of polymer blend-based thermoplastic elastomers are described in, for example, U.S. Pat. No. 4,613,533 and are particularly effective in applications involving seals, weatherstrips, hoses, wires and cables.

Since these newly developed weather resistant thermoplastic elastomers are based on chemistry substantially different from the chemistry involved in the traditional rubber particle/polymer matrix thermoplastic elastomers, the adhesives developed for use with the prior thermoplastic elastomers have been found not to form effective, heat-and water-resistant bonds with the newly developed thermoplastic elastomers. In order for these new thermoplastic elastomers to be properly utilized in appropriate applications, an adhesive must be developed which will provide for an effective, heat- and water-resistant bond between the thermoplastic elastomer and a desired substrate.

SUMMARY OF THE INVENTION

The present invention is a chemical composition which has been shown to exhibit surprisingly superior adhesive bonding capability when utilized to bond certain thermoplastic elastomers and other materials to various substrates. Specifically, the invention is a two-component adhesive for effectively bonding polymer blend-based thermoplastic elastomers and other materials such as polyvinyl chloride to various substrates such as metal or plastic. The first component of the invention contains a linear polyester polyurethane, a halogenated polyolefin, and a phenolic resin. The second component of the invention is a cross-linking compound for cross-linking the first component of the adhesive. The two components are stored separately and prior to application to a substrate, the components are thoroughly mixed together. After coating the substrate, the thermoplastic elastomer is typically applied to the coated substrate in the form of a molten material such as is carried out in a typical injection molding process. Thermoplastic elastomer-substrate bonds prepared in this manner with the adhesive of the present invention exhibit excellent primary adhesion between the bonded surfaces and demonstrate unusually high water resistance. Elastomer-substrate bonds prepared in accordance with the invention also perform reasonably well in high-temperature environments when compared to other available adhesives.

It is therefore an object of the present invention to provide a chemical composition which is capable of effectively bonding certain thermoplastic elastomers and other materials to various substrates.

It is another object of the present invention to provide a thermoplastic elastomer adhesive which is capable of producing high strength adhesive bonds between polymer blend-based thermoplastic elastomers and substrates such as metal and plastic.

It is still another object of the present invention to provide a thermoplastic elastomer adhesive which is capable of producing heat- and water-resistant adhesive bonds between polymer blend-based thermoplastic elastomers and substrates such as metal or plastic.

DETAILED DESCRIPTION OF THE INVENTION

The adhesive composition of the present invention contains two components which can be applied between a thermoplastic elastomer and a substrate under bonding conditions in order to produce an exceptionally high strength, water- and heat-resistant adhesive bond.

The first component of the present invention comprises a linear polyester polyurethane, a halogenated polyolefin and a phenolic resin. The linear polyester polyurethanes which are an essential element of the invention are typically prepared by reacting isocyanate-functional urethane polyester prepolymers with low molecular weight chain extending diols employing conventional techniques well known in the art. An extensive description of some of the useful techniques for preparing polyester urethane prepolymers can be found in Saunders and Frisch: "Polyurethanes, Chemistry and Technology," Part II, Interscience, (New York 1964), especially at pages 8 to 49, and in the references cited therein. Other preparative techniques which are known in the art can also be employed.

More specifically, the linear polyester polyurethanes which can be employed in the adhesive compositions of the present invention typically are prepared by reacting at least one linear polyester having two active hydrogen atoms with a diisocyanate in order to form an isocyanate-functional urethane polyester prepolymer. The urethane polyester prepolymer is then reacted with a low molecular weight chain extending diol in order to prepare the linear polyester polyurethane useful in the present invention.

The hydrogen atom-containing linear polyesters used to produce the polyurethanes of the invention are generally hydroxy-terminated polyesters having an average molecular weight in the range from about 500 to 4000. The linear polyesters are typically formed from bifunctional monomers having either aliphatic or aromatic segments therein. For example, the linear polyesters may be formed by reacting polyhydric alcohols with polycarboxylic acids in hydroxyl:carboxyl ratios ranging from 2:1 to 15:14. Exemplary linear polyesters useful for forming the polyurethanes of the invention include condensation products of adipic acid or terephthalic acid with 1,4-butane diol or ethylene glycol.

Any of the diisocyanates having two reactive isocyanate groups can be reacted with the linear polyester in order to create the isocyanate-functional urethane polyester prepolymers suitable for use in the practice of the invention. Such diisocyanates include, without limitation, diisocyanates such as 1,6-hexamethylene diisocyanate; 1,8-octomethylene diisocyanate; 1,12-dodecamethylene diisocyanate; 2,2,4-trimethylhexamethylene diisocyanate and similar isocyanates; 3,3'diisocyanatodipropyl ether; 3-isocyanatomethyl-3,5,5'-trimethylcyclohexyl isocyanate; cyclopentalene-1,3-diisocyanate; cyclohexylene-1,4-diisocyanate; methyl 2,6-diisocyanatocaprolate; bis-(2-isocyanatoethyl)-fumarate; 4-methyl-1,3-diisocyanatocyclohexane; trans-vinylene diisocyanate and similar unsaturated polyisocyanates; 4,4'-methylene-bis-(cyclohexylisocyanate) and related polyisocyanates; methane diisocyanates; bis-(2-isocyanatoethyl) carbonate and similar carbonate polyisocyanates; N,N'N''-tris-(6-isocyanatohexamethylene) biuret and related polyisocyanates as well as other known polyisocyanates derived from aliphatic polyamines; toluene diisocyanates; xylene diisocyanates; dianisidine diisocyanate; 4,4'-diphenylmethane diisocyanate; 1-ethoxy-2,4-diisocyanatobenzene; 1-chloro-2,4-diisocyanatobenzene; tris(4-isocyanatophenyl) methane; naphthalene diisocyanates; 4,4'-biphenyl diisocyanate; phenylene diisocyanates; 3,3'-dimethyl-4,4'-biphenyl diisocyanate; p-isocyanatobenzoyl isocyanate and tetrachloro-1,3-phenylene diisocyanate and mixtures thereof. Preferred diisocyanates include toluene diisocyanate and diphenylmethane-4,4'-diisocyanate.

The urethane polyester prepolymer is reacted with low molecular weight chain extending diols as is known in the art to produce the final linear polyester polyurethane of the invention. Typical chain extending diols include 1,4-butane diol and ethylene glycol.

Generally, the polyurethane employed in the practice of this invention has a molecular weight of at least 50,000, but preferably has a molecular weight greater than 100,000. At the present time, the preferred linear polyester polyurethanes are prepared by reacting a linear polyester with toluene diisocyanate and chain extending the prepolymer thus formed with 1,4-butane diol. The urethane preferably has a hydroxyl content of between about 0.08 and 0.12 percent and a solution viscosity (15% by weight in methyl ethyl ketone) of between about 400 and 800 centiposes. The linear polyester polyurethane is utilized in an amount from about 10 to about 99, preferably from about 60 to about 80 percent by weight of the first component.

The halogenated polyolefin of the first component can essentially be any natural or synthetic halogenated polyolefin elastomer. The halogens employed in the halogenated polyolefinic elastomers are typically chlorine or bromine, although fluorine can also be used. Mixtures of halogens can also be employed in which case the halogen-containing polyolefinic elastomer will have more than one type of halogen substituted thereon. The amount of halogen does not appear critical and can range from as low as about 3 weight percent to more than 70 weight percent, depending on the nature of the base elastomer or polymer. Generally, the halogenated polyolefin has an inherent viscosity above 100 centipoise at 20% concentration in toluene and a halogen content of 58 to 65% by weight. Halogenated polyolefins and their preparation are well-known to those skilled in the art.

Representative halogenated polyolefins include chlorinated natural rubber, chlorine- and bromine-containing synthetic rubbers and halogenated polymers derived from dienes having from 4 to 8 carbon atoms. Typical halogenated polyolefins include polychloroprene, chlorinated polychloroprene, chlorinated polypropylene, chlorinated polybutadiene, chlorinated polyisoprene, halogenated polybutylene, halogenated polyhexadiene, chlorinated butadiene styrene copolymers, chlorinated ethylene propylene copolymers and ethylene/propylene/non-conjugated diene terpolymers, chlorinated polyethylene, chlorosulfonated polyethylene, halogenated copolymers of dissimilar $\alpha$-olefins of 2 to 8 carbon atoms, chlorinated poly(vinyl chloride), and the like, including mixtures of such halogen-containing elastomers. The halogenated polyolefin of the first component can also be halogenated vinyl halide polymers including halogenated homopolymers or copolymers of vinyl halide. These halogenated materials can be made by post-halogenating the vinyl-halide resin, preferably by post-chlorinating polyvinylchloride. Such materials are commercially available and include, for instance, Genchlor S and Genchlor T, manufactured by Imperial Chemical Industries, Ltd.

Thus, substantially any of the known halogen-containing derivatives of natural and synthetic elastomers can be employed as the halogenated polyolefin in the practice of this invention, including mixtures of such elastomers. At the present time, chlorinated polyisoprene is the preferred halogenated polyolefin for use in the present invention. The polyolefin is normally utilized in an amount from about 0.2 to about 60 percent by weight, preferably from about 15 to about 30 percent by weight of the first component.

The phenolic resins which are suitable for use in the practice of the invention are selected from the group consisting of phenol-aldehyde condensates. Such resins are prepared according to well-known methods by condensing phenolic compounds and aldehydes, usually under acidic to neutral conditions. Also included within the purview of phenolic resins are the reaction products obtained by further condensing a formed resole resin with additional phenolic compound. For more detailed information regarding phenolic resins, including methods of preparation, see Carswell "Phenoplasts," Interscience Publishers, Inc., New York, N.Y., (1947), which treatise is incorporated herein by reference. Suitable phenolic resins include resinous oils as well as pulverulent solids.

In forming the phenolic resins which are employed in the practice of this invention, there can be utilized a variety of phenolic compounds, i.e., both monohydroxy and polyhydroxy phenols, including such compounds having at least one aromatic nucleus, and substituted derivatives thereof, and including mixtures of such phenolic compounds. Among the substituent groups which can be attached to the nucleus of the phenolic compound are alkyl, alkoxy, amino, halogen and the like. Representative phenolic compounds include, without being limited thereto, phenol, p-t-butylphenol, p-phenylphenol, p-chlorophenol, p-alkoxyphenol, o-cresol, m-cresol, o-chlorophenol, m-bromophenol, 2-ethylphenol, amyl phenol, nonyl phenol, cashew nut shell liquid, resorcinol, orcinol, pyrocatechol, pyrogallol, salicylic acid, bis-phenol A, bis-phenol S, and the like. Preferred phenolic resins are obtained when the phenolic precursors comprise:

(a) 100 mole percent of at least one polyhydroxy phenol such as resorcinol, pyrogallol, catechol and the like;

(b) from about 50 to about 98, preferably about 60 to about 98, mole percent of at least one polyhydroxy phenol and from about 50 to about 2, preferably about 40 to about 2, mole percent of at least one monohydric phenol, the nucleus of which is not substituted with a hydrocarbon radical, i.e. a radical containing only carbon and hydrogen atoms, although the nucleus can be substituted with groups such as alkoxy, amino, halogen, and the like;

(c) from about 10 to about 98, preferably about 50 to about 98 mole percent of at least one polyhydroxy phenol and from about 90 to about 2, preferably about 50 to about 2, mole percent of at least one monohydric phenol, the nucleus of which is substituted with at least one alkyl group having from 1 to 22 carbon atoms; or (d) 100 mole percent of at least one monohydric phenol, the nucleus of which is substituted with at least one alkyl group having from 1 to 22 carbon atoms; said mole percents being based on total moles of phenolic compound.

It has been found that particularly preferred phenolic resins for use in the invention are obtained by utilizing a mixture of pyrogallol and resorcinol as the phenolic precursors. Specifically, a phenolic resin prepared from a mixture containing from about 1 to about 99, preferably about 20 to about 80 mole percent of pyrogallol and from about 99 to about 1, preferably about 80 to about 20 mole percent of resorcinol has been shown to provide excellent adhesion when utilized in the present invention.

Representative aldehydes which can be condensed with phenolic compounds to form phenolic resins include, without being limited thereto, formaldehyde, acetaldehyde, propionaldehyde, isobutyraldehyde, 2-ethylbutyraldehyde, glyceraldehyde, 2-methylpentaldehyde, 2-ethylhexaldehyde, as well as compounds which decompose to formaldehyde, such as paraformaldehyde, trioxane, furfural, hexamethylenetetramine, acetals which liberate formaldehyde on heating benzaldehyde, and the like. The preferred aldehyde is formaldehyde. The aldehyde is typically utilized in an amount ranging from about 20 to about 90, preferably from about 40 to about 80 mole percent per 100 mole percent of the total phenolic percursor or precursor mixture to produce the phenolic resin of the invention.

The phenolic resin of the present invention is typically utilized in an amount from about 0.5 to about 20, preferably from about 2 to about 13 percent by weight of the first component.

The second component of the present invention is a cross-linking compound which cross-links or cures the first component of the invention. The cross-linking compound can essentially be any material which will effectively cure or cross-link the first component of the invention. The cross-linking compound is preferably a diisocyanate compound such as 2,4-toluene diisocyanate, diphenylmethane-4,4'-diisocyanate, p-phenylene diisocyanate, m-phenylene diisocyanate, 1,4-cyclohexyl diisocyanate, tetramethylxylyl diisocyanate and dimethyldiphenyl diisocyanate, with diphenylmethane-4,4'-diisocyanate being the preferred diisocyanate compound. The cross-linker is typically utilized in an amount from about 4 to about 32, preferably from about 8 to about 20 parts by weight per 100 parts by weight of the first component.

A solvent is required to dissolve the respective components. Solvents used for dissolving the first component include polar or aromatic solvents such as methyl ethyl ketone, methyl isobutyl ketone, xylene and toluene, with methyl ethyl ketone and xylene being preferred. The solvent for the first component is utilized in an amount sufficient to provide a component having a total solids content (TSC) of from about 10 to about 50, preferably from about 15 to about 30. A solvent, although not necessary, may be utilized to dissolve the second component of the invention. Typical solvents useful for dissolving the second component include halogenated solvents such as 1,1,1-trichloroethane and perchloroethylene with 1,1,1-trichloroethane being preferred. The solvent for the second component is utilized in an amount sufficient to provide a component having a total solids content of from about 1 to about 100, preferably from about 30 to about 60.

The formulation of the present invention can optionally contain other well-known additives including plasticizers, fillers, pigments, reinforcing agents and the like, in amounts employed by those skilled in the art to obtain desired color and consistency.

The two components of the present invention must be stored separately in order to avoid any premature cross-linking or curing of the formulation. The adhesive of the invention is typically applied to a desired substrate by first mixing the first component and the second component together in the amounts described previously. After the initial mixing, the resulting formulation must be applied within at least about 30 days but preferably within about 2 days in order to avoid a premature increase in viscosity. Most preferably, the formulation is applied immediately after mixing the two components in order to avoid any increase in viscosity which might create problems associated with the corresponding application technique. The formulation may be applied to a desired substrate by techniques known in the art such as by brushing, spraying, or dipping the substrate with the formulation. Preferably, the formulation is applied by dipping or brushing.

In general, after applying the formulation and allowing it to dry for a period of between about 12 and 24 hours, the two surfaces to be bonded should be brought together under at least about 1 psi/sq. in. of pressure in order to create a permanent bond. No additional heating is required to effect the bonding.

When bonding thermoplastic elastomers to various substrates, the thermoplastic elastomer is typically applied to the surface of the substrate from an injection molding device according to techniques well-known in the art. A thermoplastic elastomer applied from such a molding device typically has an initial temperature of from about 320° F. to about 350° F. and the coated substrate and thermoplastic elastomer are brought together under a pressure of from about 500 to about 4000 psi, preferably from about 2000 to about 3000 psi. No additional heating of the coated substrate is required for the adhesive of the invention to sufficiently bond the thermoplastic elastomer to the substrate. After the thermoplastic elastomer and substrate are brought together, the elastomer-substrate assembly is allowed to cool for a period of from about 12 hours to about 24 hours in order to ensure sufficient cross-linking of the formulation. The thermoplastic elastomer and the substrate may also be bonded according to other methods such as assembly bonding or extrusion.

Although the adhesive formulation of the present invention has shown exceptional bonding ability with polymer blend-based thermoplastic elastomers, the adhesive may be utilized to bond substrates to various other materials such as polyvinyl chloride, polyether esters, polyether amides, and thermoplastic polyurethanes. The substrates to which the thermoplastic elastomers and other materials may be bonded include substrates such as metal, plastic, glass, leather, yarns, cords, and fabric. The adhesive formulation of the invention is preferably utilized to bond a polymer blend-based thermoplastic elastomer to a metal substrate. Various metals which may be bonded according to the present invention include any of the common structural metals such as iron, steel (including stainless steel), lead, aluminum, copper, brass, bronze, Monel metal, nickel, zinc, and the like. The formulation of the invention may also be utilized as a coating or as a primer for adhesive compositions.

The following examples are presented in order to further illustrate the invention but are not intended to limit in any manner the scope of the invention.

EXAMPLE 1

To 372 mls of methyl ethyl ketone was added 100 g of a linear polyester polyurethane purchased from Mobay under the trade name DESMOCOLL 500 and the mixture was stirred until the linear polyester polyurethane was totally dissolved. To 139 mls of xylene was added 30 g of chlorinated polyisoprene and the mixture was stirred until the halogenated polyolefin was totally dissolved. To 3.5 mls of propylene glycol methyl ether (DOWANOL PM, sold by the Dow Chemical Company) was added 3 g of a phenolic resin prepared by reacting 50 mole percent of pyrogallol with 50 mole percent resorcinol in the presence of 60 mole percent formaldehyde based on the total phenolic mixture, and the resin/solvent mixture was stirred until the resin was totally dissolved. The polyurethane, polyolefin, and phenolic resin solutions were blended together in order to form the first component of the adhesive. To the first component was added 33.5 g of diphenylmethane-4,4'-diisocyanate dissolved in 1,1,1-trichloroethane (TSC 50%), and the mixture was shaken on a paint shaker until a uniform mixture was achieved. The resulting formulation was applied to cleaned, grit-blasted 1010 steel coupons by pouring the formulation over the coupons which were masked so that only an area measuring one square inch was coated with the formulation. The coated coupons were then dried in a fume hood to remove all of the solvents.

The coupons were then placed in a 4-cavity injection mold of an Injectamatic injection molding press available from Hydratecs Inc. The molding press was operated with a nozzle temperature of 150° F., a screw barrel temperature of 400° F., a ram barrel temperature of 450° F., a top platen temperature of 150° F. and a clamp pressure of 3000 psi, and was operated on a cycle time of approximately 30 seconds. A thermoplastic elastomer sold under the trade name ALCRYN by DuPont was injected into the cavities. After bonding and demolding the coupons, the coupons were allowed to cool for 24 hours before testing.

EXAMPLE 2

Coupons were bonded as described in Example 1 except that 7 g grams of the phenolic resin was utilized in the first component.

EXAMPLE 3

Coupons were bonded as described in Example 1 except that 10 g grams of the phenolic resin was utilized in the first component.

EXAMPLE 4

Coupons were bonded as described in Example 1 except that 15 g grams of the phenolic resin was utilized in the first component.

DESCRIPTION OF TESTS

Primary Adhesion per ASTM D429B: Parts were tested at room temperature with a 45 degree peel angle. Peel strength (lbs.) and % rubber retention were recorded.

7 Day Room Temperature Water Immersion: Parts were stressed using binder clips. After immersion, the parts dried overnight at ambient conditions. Testing occurred the following day at room temperature with a peel angle of 45 degrees. Peel strength (lbs.) and % rubber retention were recorded.

150 degree F. Adhesion: Parts were heated to 150° F. for 15 minutes before testing. Testing occurred at 150° F. with a peel angle of 45 degrees. Peel strength (lbs.) and % rubber retention were recorded.

The results of the tests as performed on each of the examples are described in Table 1 below. The designation X# YR indicates that the bond failed at X lbs. of force and retained Y percent of rubber on the coupon after bond failure.

TABLE 1

| | Test Results | | |
|---|---|---|---|
| Example | Prim. Adh. | 7 Day RT Water | 150 F Adh. |
| 1 | 106# 100R | 112# 97R | 45# 25R |
| 2 | 112# 99R | 112# 94R | 47# 34R |
| 3 | 115# 100R | 113# 100R | 44# 47R |
| 4 | 113# 100R | 116# 100R | 47# 16R |

As can be seen from the data presented in Table 1, the adhesive of the present invention provides for excellent bonding of metal substrates to polymer blend-based thermoplastic elastomers. It should be noted that although the rubber retention experienced in the 150° F. adhesion test is not as high as the retention in other tests, any degree of rubber retention in this test is significant since other available adhesive systems will not even provide a primary adhesion between polymer blend-based thermoplastic elastomers and a metal surface.

What is claimed is:

1. A chemical formulation comprising a linear polyester polyurethane, a halogenated polyolefin, a phenolic resin, and a cross-linker.

2. A chemical formulation according to claim 1 wherein the urethane comprises the reaction product of an isocyanate-functional urethane polyester prepolymer and a low molecular weight chain extending diol and is present in an amount from about 10 to about 99 percent by weight based on the total amount of urethane, polyolefin and phenolic resin.

3. A chemical formulation according to claim 1 wherein the halogenated polyolefin comprises chlorinated polyisoprene and is present in an amount from about 0.2 to about 60 percent by weight based on the total amount of urethane, polyolefin and phenolic resin.

4. A chemical formulation according to claim 1 wherein the phenolic resin comprises the reaction product of pyrogallol, resorcinol and formaldehyde and is present in an amount from about 0.5 to about 20 percent by weight based on the total amount of urethane, polyolefin and phenolic resin.

5. A chemical formulation according to claim 1 wherein the cross-linker comprises diphenylmethane-4,4'-diisocyanate and is present in an amount from about 4 to about 32 parts by weight per 100 parts by weight of the total amount of urethane, polyolefin and phenolic resin.

6. A chemical formulation according to claim 2 wherein the urethane is the reaction product of a linear polyester, toluene diisocyanate and 1,4-butane diol and is present in an amount from about 60 to about 80 percent by weight based on the total amount of urethane, polyolefin and phenolic resin.

7. A chemical formulation according to claim 3 wherein the chlorinated polyisoprene is present in an amount from about 15 to about 30 percent by weight based on the total amount of urethane, polyolefin and phenolic resin.

8. A chemical formulation according to claim 4 wherein the phenolic resin is the reaction product of from about 20 to 80 mole percent pyrogallol, from about 80 to 20 mole percent resorcinol, and from about 40 to 80 mole percent formaldehyde based on the total amount of pyrogallol and resorcinol, and is present in an amount from about 2 to about 13 percent by weight based on the total amount of urethane, polyolefin and phenolic resin.

9. A chemical formulation according to claim 5 wherein the cross-linker is present in an amount from about 8 to about 20 parts by weight per 100 parts by weight of the total amount of urethane, polyolefin and phenolic resin.

10. A two-component adhesive for bonding polymer blend-based thermoplastic elastomers wherein the first component comprises a linear polyester polyurethane, a halogenated polyolefin, and a phenolic resin and wherein the second component comprises a cross-linker.

11. An adhesive according to claim 10 wherein the urethane is the reaction product of a linear polyester, toluene diisocyanate and 1,4-butane diol and is present in an amount from about 60 to about 80 percent by weight of the first component.

12. An adhesive according to claim 10 wherein the halogenated polyolefin is chlorinated polyisoprene and is present in an amount from about 15 to about 30 percent by weight of the first component.

13. An adhesive according to claim 10 wherein the phenolic resin is the reaction product of from about 20 to 80 mole precent pyrogallol, from about 80 to 20 mole percent resorcinol, and from about 40 to 80 mole percent formaldehyde based on the total amount of pyrogallol and resorcinol, and is present in an amount from about 2 to about 13 percent by weight of the first component.

14. An adhesive according to claim 10 wherein the cross-linker is diphenylmethane-4,4'-diisocyanate and is present in an amount from about 8 to about 20 parts by weight per 100 parts by weight of the first component.

* * * * *